United States Patent
Hugg et al.

(10) Patent No.: US 9,534,846 B2
(45) Date of Patent: Jan. 3, 2017

(54) METHOD FOR MANUFACTURING A MELT LAUNDER AND A MELT LAUNDER

(71) Applicant: Outotec (Finland) Oy, Espoo (FI)

(72) Inventors: Eero Hugg, Espoo (FI); Kari Pienimaki, Espoo (FI); Mika Ketola, Espoo (FI); Mikael Jafs, Espoo (FI)

(73) Assignee: Outotec (Finland) Oyj, Espoo (FI)

( * ) Notice: Subject to any disclaimer, the term of this patent is extended or adjusted under 35 U.S.C. 154(b) by 181 days.

(21) Appl. No.: 14/377,799

(22) PCT Filed: Feb. 8, 2013

(86) PCT No.: PCT/FI2013/050143
§ 371 (c)(1),
(2) Date: Aug. 8, 2014

(87) PCT Pub. No.: WO2013/117821
PCT Pub. Date: Aug. 15, 2013

(65) Prior Publication Data
US 2015/0184940 A1 Jul. 2, 2015

(30) Foreign Application Priority Data
Feb. 9, 2012 (FI) ...................................... 20125140

(51) Int. Cl.
*F27D 3/14* (2006.01)
*F27D 15/02* (2006.01)
(Continued)

(52) U.S. Cl.
CPC ............... *F27D 3/145* (2013.01); *B23P 15/00* (2013.01); *C21B 7/14* (2013.01); *F27D 3/14* (2013.01);
(Continued)

(58) Field of Classification Search
CPC ............ B23P 15/00; C21B 7/14; F27D 15/00; F27D 15/02; F27D 3/14; F27D 3/145; Y10T 29/4988
(Continued)

(56) References Cited

U.S. PATENT DOCUMENTS 3,521,698 A * 7/1970 Colombo ............... B22D 11/10
164/136
4,269,399 A 5/1981 Tinnes et al.
(Continued)

FOREIGN PATENT DOCUMENTS

AT 379 172 B 11/1985
CN 1571910 A 1/2005
(Continued)

OTHER PUBLICATIONS

Korean Patent Office Notice of Grounds for Rejection for corresponding Korean Patent Application No. 2014-7024859, 7 pgs, and English translation of Grounds for Rejection, 6 pgs.
(Continued)

*Primary Examiner* — Jessee Roe
*Assistant Examiner* — Michael Aboagye
(74) *Attorney, Agent, or Firm* — Chernoff, Vilhauer, McClung & Stenzel, LLP

(57) ABSTRACT

The invention relates to a method for manufacturing a melt launder to be used for transferring molten phase such as slag, matte, or metal formed in a process for the production of metals. The invention also relates to a melt launder to be used for transferring molten phase such as slag, matte, or metal formed in a process for the production of metals. The melt launder comprises a launder body of metal, a flow channel for molten phase, a refractory lining for lining the launder body of metal so that the refractory lining at least partly forms a flow surface for molten phase in the flow
(Continued)

Figure 1:
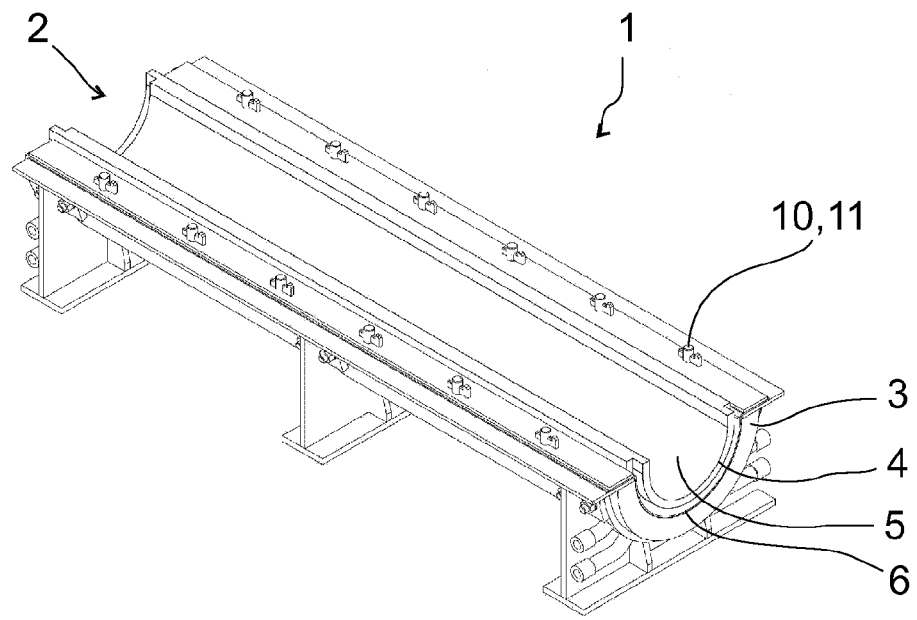

channel for molten phase, and a layer of steel between the launder body of metal and the refractory lining.

6 Claims, 2 Drawing Sheets

(51) Int. Cl.
  *B23P 15/00* (2006.01)
  *F27D 15/00* (2006.01)
  *C21B 7/14* (2006.01)
(52) U.S. Cl.
  CPC ............... *F27D 15/00* (2013.01); *F27D 15/02* (2013.01); *Y10T 29/49885* (2015.01)
(58) Field of Classification Search
  USPC .......................................... 222/606; 266/236
  See application file for complete search history.

(56) References Cited

U.S. PATENT DOCUMENTS

| | | |
|---|---|---|
| 4,531,717 A | 7/1985 | Hebrant |
| 5,744,093 A | 4/1998 | Davis |
| 7,264,769 B1 | 9/2007 | Afeltra et al. |
| 7,700,036 B2 * | 4/2010 | Sipila ............... B22D 35/06 266/196 |
| 2004/0245684 A1* | 12/2004 | Kojo .................. C21B 7/14 266/227 |
| 2011/0127020 A1 | 6/2011 | Peuraniemi et al. |
| 2011/0140318 A1 | 6/2011 | Reeves et al. |

FOREIGN PATENT DOCUMENTS

| | | |
|---|---|---|
| DE | 102 23 606 A1 | 12/2003 |
| EP | 1 752 726 A1 | 2/2007 |
| GB | 2 049 135 A | 12/1980 |
| JP | 47-36965 | 11/1972 |
| JP | 54-163105 | 11/1979 |
| JP | H08246014 A | 9/1996 |
| JP | H11 189830 A | 7/1999 |
| JP | H11189830 A | 7/1999 |
| KR | 1020050034611 | 4/2005 |
| KR | 1020110025762 | 3/2011 |
| WO | 03/033982 A1 | 4/2003 |
| WO | 2010/000940 A1 | 1/2010 |
| WO | 2011/069249 A1 | 6/2011 |

OTHER PUBLICATIONS

Office Action from corresponding Chinese patent application No. 201380008058.4, date of notification: Mar. 2, 2015, 17 pgs., with English translation.
International Search Report, PCT/FI2013/050143, completed May 20, 2013, mailed May 28, 2013, 3 pages.
Notification of Reasons for Refusal from corresponding Japanese Patent Application No. 2014-556117, dated Jul. 31, 2015, 11 pgs., with English translation.
Supplementary European Search Report issued by the European Patent Office for EP 13 74 7073; mailed Nov. 18, 2015, 7 pages.

* cited by examiner

METHOD FOR MANUFACTURING A MELT LAUNDER AND A MELT LAUNDER

CROSS-REFERENCE TO RELATED APPLICATION

This is a national stage application filed under 35 USC 371 based on International Application No. PCT/FI2013/050143 filed Feb. 8, 2013, and claims priority under 35 USC 119 of Finnish Patent Application No. 20125140 filed Feb. 9, 2012.

FIELD OF THE INVENTION

The invention relates to a method for manufacturing a melt launder that comprises a flow channel for molten phase and that is to be used for transferring molten phase such as slag, matte, or metal formed in a process for the production of metals.

The invention also relates to melt launder to be used for transferring molten phase such as slag, matte, or metal formed in a process for the production of metals, wherein the melt launder comprises a launder body of metal, and a flow channel for molten phase.

Melt launder is used for example for transferring molten materials such as metal, matte, or slag from smelters.

Document WO 03/033982 presents a melt launder comprising a bottom and edges, said melt launder being particularly meant to be used for tapping a molten phase, such as slag, from a smelting furnace, which melt launder is manufactured of copper or copper alloy and provided with cooling channels.

OBJECTIVE OF THE INVENTION

The object of the invention is to provide an improved method for manufacturing a melt launder and an improved melt launder.

SHORT DESCRIPTION OF THE INVENTION

The invention is based on lining the launder body of metal with a refractory lining so that the refractory lining at least partly forms a flow surface for molten phase in the flow channel for molten phase and on arranging a layer of steel between the launder body of metal and the refractory lining.

In one preferred embodiment the layer of steel has a first face that is in contact with the launder body of metal and an opposite second face that is in contact with the refractory lining.

In one preferred embodiment the refractory lining is attached to the layer of steel and the layer of steel is releasable attached to the launder body of metal. Especially this will enable a quick removal of the refractory lining together with the layer of steel from the launder body of metal for example when replacing the refractory lining.

The layer of steel also protects the launder body of metal from direct contact with the transferred molten material i.e. the transferred molten phase.

LIST OF FIGURES

Figure 2:
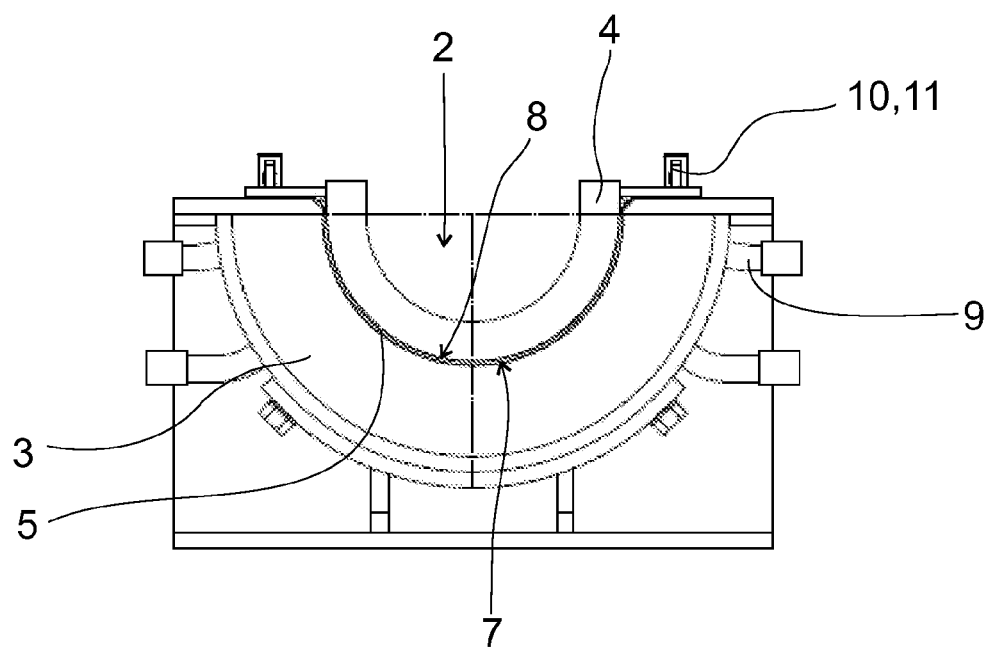
Figure 3:
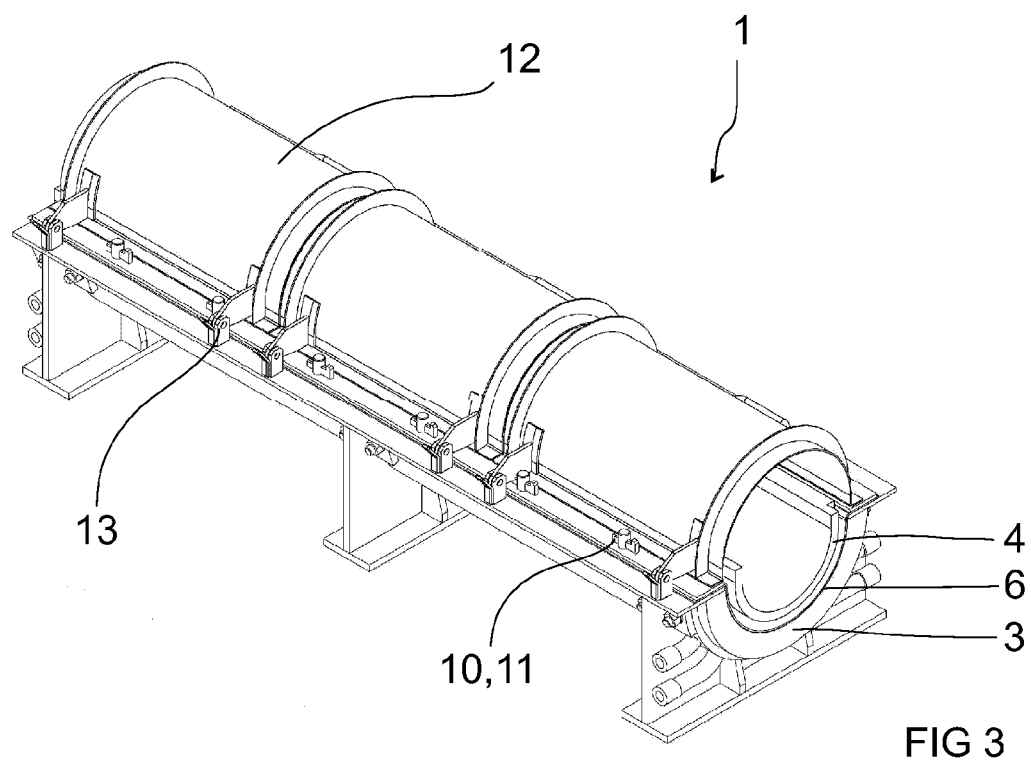
Figure 4:
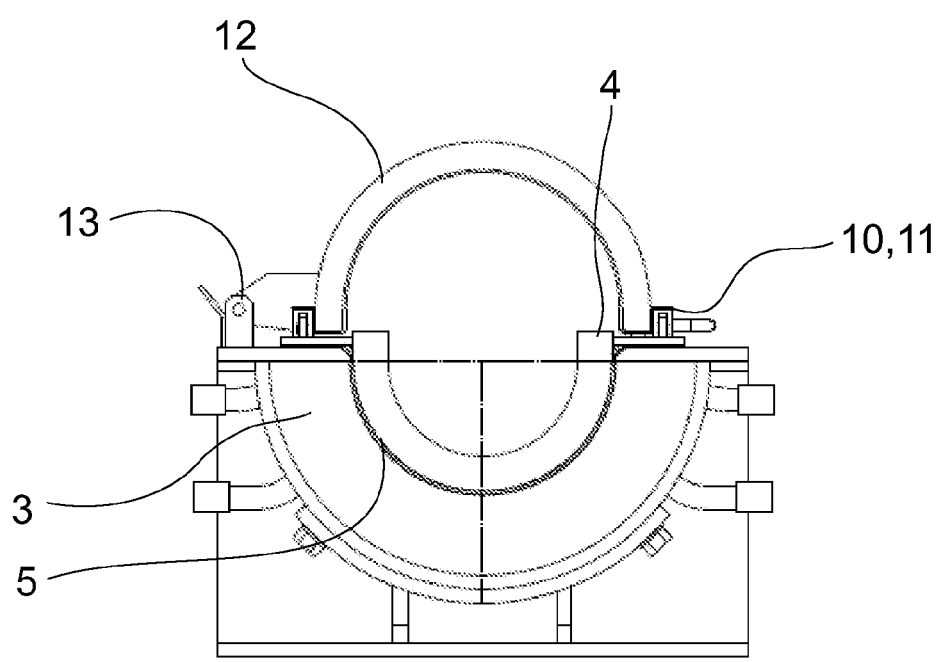

In the following the invention will be described in more detail by referring to the figures, of which FIG. 1 shows a melt launder according to an embodiment of the invention, FIG. 2 shows the melt launder shown in FIG. 1 as seen from one end, FIG. 3 shows a melt launder in cross-section according to another embodiment of the invention, and FIG. 4 shows the melt launder shown in FIG. 3 as seen from one end.

DETAILED DESCRIPTION OF THE INVENTION

The invention relates to a method for manufacturing a melt launder 1 to be used for transferring molten phase (not shown in the figures) such as slag, matte, or metal formed in a process (not shown in the figures) for the production of metals.

The invention also relates to a melt launder 1 to be used for transferring molten phase such as slag, matte, or metal formed in a process for the production of metals.

First the method for manufacturing a melt launder 1 that comprises a flow channel 2 for molten phase and that is to be used for transferring molten phase such as slag, matte, or metal formed in a process for the production of metals and some preferred embodiments and variants of the method will be described in greater detail.

The method comprises a providing step for providing a launder body of metal 3.

The method comprises also a lining step for lining the launder body of metal 3 with a refractory lining 4 so that the refractory lining 4 at least partly forms a flow surface 5 for molten phase in the flow channel 2 for molten phase.

The method comprises preferably a lining step for lining the launder body of metal 3 with a refractory lining 4 so that the refractory lining 4 fully forms a flow surface 5 for molten phase in the flow channel 2 for molten phase.

It is obvious to a person skilled in the art that the providing step and that the lining step may be combined to a combined providing and lining step for providing a launder body of metal 3 having a refractory lining 4 so that the refractory lining 4 at least partly forms a flow surface 5 for molten phase in the flow channel 2 for molten phase.

The providing step for providing a launder body of metal 3 may comprise providing a launder body of metal 3 comprising a longitudinal groove (not marked with a reference number) in which the refractory lining 4 is arranged so that the refractory lining 4 at least partly forms a flow surface 5 for molten phase in the flow channel 2 for molten phase.

The providing step for providing a launder body of metal 3 may comprise a step for manufacturing said launder body of metal 3. The launder body of metal 3 can be manufactured in many different ways. One possible way is to manufacture the launder body of metal 3 from a round metal billet through machining. Another possible way is to manufacture the launder body of metal 3 through casting. Yet another possible way is to manufacture the launder body of metal 3 by rolling and bending from a billet. The launder body of metal 3 can be manufactured so that it comprises a longitudinal groove in which the refractory lining 4 is arranged so that the refractory lining 4 at least partly forms a flow surface 5 for molten phase in the flow channel 2 for molten phase. The launder body of metal 3 can be manufactured at least partly from copper or copper alloy. The launder body of metal 3 can be manufactured from copper or copper alloy.

The refractory lining 4 can for example comprise graphite or be of graphite, and/or comprise carbon-based refractory material such as carbon, semi-graphite, silicon carbide and/or comprises insulating refractory material and/or zirconium-oxide.

The method comprises an arranging step for arranging a layer of steel 6 between the launder body of metal 3 and the refractory lining 4.

In one embodiment of the method the arranging step includes arranging a layer of steel 6 between the launder body of metal 3 and the refractory lining 4 such that the layer of steel 6 has a first face 7 that is in contact with the launder body of metal 3 and an opposite second face 8 that is in contact with the refractory lining 4.

The arranging step may include using a steel sheet such as a stainless steel sheet in the layer of steel 6.

The arranging step may include using a steel sheet such as a stainless steel sheet as the layer of steel 6. The arranging step for arranging a layer of steel 6 between the launder body of metal 3 and the refractory lining 4 may include a coating step for at least partly coating the launder body of metal 3 with a layer of steel 6 so that a layer of steel 6 that is in the form of a coating of steel on the launder body of metal 3 is arranged between the launder body of metal 3 and the refractory lining 4. The coating step may include explosion welding a layer of steel 6 such as a steel sheet to the launder body of metal 3 to form said layer of steel 6 that is in the form of a coating of steel on the launder body of metal 3.

The arranging step for arranging a layer of steel 6 between the launder body of metal 3 and the refractory lining 4 may include a coating step for at least partly coating the refractory lining 4 with a layer of steel 6 so that a layer of steel 6 that is in the form of a coating of steel on the refractory lining 4 is arranged between the launder body of metal 3 and the refractory lining 4. The coating step may include explosion welding a layer of steel 6 such as a steel sheet to the refractory lining 4 to form said layer of steel 6 that is in the form of a coating of steel on the refractory lining 4.

The arranging step for arranging a layer of steel 6 between the launder body of metal 3 and the refractory lining 4 a combination of the embodiments described above; using a steel sheet in the layer of steel 6, at least partly coating the launder body of metal 3 with a layer of steel 6, and at least partly coating the refractory lining 4 with a layer of steel 6.

The providing step may include providing such a launder body of metal 3 that is provided with cooling channels 9 for circulating cooling medium in the launder body of metal 3. Alternatively, the providing step may include a step for equipping such a launder body of metal 3 with cooling channels 9 for circulating cooling medium in the launder body of metal 3.

The providing step may include providing such a launder body of metal 3 that is at least partly made of copper.

The method may comprise attaching the refractory lining 4 to the layer of steel 6. Especially this will enable a quick removal of the refractory lining 4 together with the layer of to steel 6 from the launder body of metal 3 for example when replacing the refractory lining 4.

The method may comprise releasable attaching the layer of steel 6 to the launder body of metal 3.

The method may comprise providing the layer of steel 6 and the launder body of metal 3 with co-operating fasteners 10 for releasable attaching the layer of steel 6 to the launder body of metal 3.

The method may include providing the layer of steel 6 with lifting means 11 for lifting the layer of steel 6 from the launder body of metal 3 to detach the layer of steel 6 to the launder body of metal 3.

The method may include providing the melt launder 1 with a lid 12, which may be removable and/or openable. The lid 12 may comprise several lid sections (not marked with a reference numeral). In FIGS. 3 and 4 an embodiment of the melt launder 1 is shown that has a lid 12 that is connected to the rest of the melt launder 1 by means of hinges 13 making the lid openable. By disassembling the hinges 13 the lid 12 can also be removed from the rest of the melt launder 1.

Next the melt launder 1 to be used for transferring molten phase such as slag, matte, or metal formed in a process for the production of metals and some preferred embodiments and variants of the melt launder 1 will be described in greater detail.

The melt launder 1 comprises a launder body of metal 3.

The melt launder 1 comprises a flow channel 2 for molten phase.

The launder body of metal 3 is provided with a refractory lining 4 so that the refractory lining 4 at least partly forms a flow surface 5 for molten phase in the flow channel 2 for molten phase.

The refractory lining 4 can for example comprise graphite or be of graphite, and/or comprise carbon-based refractory material such as carbon, semi-graphite, silicon carbide and/or comprises insulating refractory material and/or zirconium-oxide.

The launder body of metal 3 may comprise a longitudinal groove in which the refractory lining 4 is arranged to form the flow channel 2 for molten phase.

The melt launder 1 comprises a layer of steel 6 between the launder body of metal 3 and the refractory lining 4.

In one embodiment of the melt launder 1 the layer of steel 6 is arranged between the launder body of metal 3 and the refractory lining 4 such that the layer of steel 6 has a first face 7 that is in contact with the launder body of metal 3 and an opposite second face 8 that is in contact with the refractory lining 4.

The layer of steel 6 may include a steel sheet such as a stainless steel sheet.

The layer of steel 6 may be a steel sheet such as a stainless steel sheet.

The launder body of metal 3 may be at least partly coated with a layer of steel 6 so that a layer of steel 6 that is in the form of a coating of steel on the launder body of metal 3 is provided between the launder body of metal 3 and the refractory lining 4. The layer of steel 6 that is in the form of a coating of steel on the launder body of metal 3 may be explosion welded to the launder body of metal 3. The refractory lining 4 may be at least partly coated with a layer of steel 6 so that a layer of steel 6 that is in the form of a coating of steel on the refractory lining 4 is provided between the launder body of metal 3 and the refractory lining 4. The layer of steel 6 that is in the form of a coating of steel on the refractory lining 4 may be explosion welded to the refractory lining 4.

The melt launder 1 may be provided with layers of steel 6 formed by a combination of the embodiments described above; a steel sheet in the layer of steel 6, a layer of steel 6 in the form of a coating of steel at least partly coating the launder body of metal 3, and a layer of steel 6 in the form of a coating of steel at least partly coating the refractory lining 4.

The launder body of metal 3 may be provided with cooling channels 9 for circulating cooling medium in the launder body of metal 3.

The launder body of metal 3 may be at least partly made of copper or copper alloy.

The launder body of metal 3 can be manufactured from copper or copper alloy.

The refractory lining 4 may be attached to the layer of steel 6.

The layer of steel 6 may be releasable attached to the launder body of metal 3.

The layer of steel 6 and the launder body of metal 3 may be provided with co-operating fasteners 10 for releasable attaching the layer of steel 6 to the launder body of metal 3.

The layer of steel 6 being may be provided with lifting means 11 for lifting the layer of steel 6 from the launder body of metal 3 to detach the layer of steel 6 from the launder body of metal 3.

The melt launder 1 may be provided with a lid 12, which may be removable and/or openable. The lid 13 may comprise several lid sections (not marked with a reference numeral). In FIGS. 3 and 4 an embodiment of the melt launder 1 is shown that has a lid 12 that is connected to the rest of the melt launder 1 by means of hinges 13 making the lid openable. By disassembling the hinges 13 the lid 12 can also be removed from the rest of the melt launder 1.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A melt launder, wherein the melt launder comprises
  a launder body of metal,
  a flow channel for molten phase, and
  a refractory lining for lining the launder body of metal so that the refractory lining at least partly forms a flow surface for molten phase in the flow channel,
  wherein the melt launder comprises a layer of stainless steel between the launder body of metal and the refractory lining,
  wherein the refractory lining being attached to the layer of stainless steel,
  wherein the layer of stainless steel being releasable attached to the launder body of metal, and
  wherein the layer of stainless steel has a first face that is in contact with the launder body of metal and an opposite second face that is in contact with the refractory lining.

2. The melt launder according to claim 1, wherein the layer of stainless steel and the launder body of metal being provided with co-operating fasteners for releasable attaching the layer of stainless steel from the launder body of metal.

3. The melt launder according to claim 1, wherein the launder body of metal being provided with cooling channels for circulating cooling medium in the launder body of metal.

4. The melt launder according to claim 1, wherein the launder body of metal being at least partly made of copper or copper alloy.

5. The melt launder according to claim 1, wherein the layer of stainless steel being provided with lifting means for lifting the layer of stainless steel from the launder body of metal to detach the layer of stainless steel to the launder body of metal.

6. The melt launder according to claim 1, wherein the refractory lining comprising at least one of graphite, insulating refractory material, zirconium-oxide and carbon-based refractory material including carbon, semi-graphite, silicon carbide.

\* \* \* \* \*